US008290163B2

(12) United States Patent
Chang et al.

(10) Patent No.: US 8,290,163 B2
(45) Date of Patent: Oct. 16, 2012

(54) AUTOMATIC WIRELESS NETWORK PASSWORD UPDATE

(75) Inventors: David Yu Chang, Austin, TX (US); John Yow-Chun Chang, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 12/049,294

(22) Filed: Mar. 15, 2008

(65) Prior Publication Data
US 2008/0159536 A1    Jul. 3, 2008

Related U.S. Application Data

(63) Continuation of application No. 11/336,205, filed on Jan. 20, 2006, now abandoned.

(51) Int. Cl.
H04L 29/06    (2006.01)
(52) U.S. Cl. ......... 380/273; 380/272; 380/279; 713/163
(58) Field of Classification Search .................. 380/272, 380/273, 279, 281; 713/163
See application file for complete search history.

(56) References Cited

U.S. PATENT DOCUMENTS

| | | | | |
|---|---|---|---|---|
| 6,760,843 B1 | 7/2004 | Carter | | 713/200 |
| 6,971,005 B1* | 11/2005 | Henry et al. | | 713/155 |
| 7,373,508 B1* | 5/2008 | Meier et al. | | 713/168 |
| 7,451,222 B2 | 11/2008 | Sullivan | | 709/227 |
| 2002/0178370 A1 | 11/2002 | Gurevich et al. | | 713/189 |
| 2003/0005299 A1 | 1/2003 | Xia et al. | | 713/171 |
| 2003/0219129 A1* | 11/2003 | Whelan et al. | | 380/270 |
| 2004/0006647 A1 | 1/2004 | Kim et al. | | 709/249 |
| 2004/0081320 A1* | 4/2004 | Jordan et al. | | 380/247 |
| 2004/0083393 A1 | 4/2004 | Jordan et al. | | 713/202 |
| 2005/0022006 A1 | 1/2005 | Bass et al. | | 713/201 |
| 2008/0159536 A1 | 7/2008 | Chang et al. | | 380/258 |

FOREIGN PATENT DOCUMENTS
WO    WO2004093381 A1    10/2004

OTHER PUBLICATIONS

Office Action for U.S. Appl. No. 11/336,205, mailed Jun. 18, 2009, 12 pages.

* cited by examiner

Primary Examiner — Justin T Darrow
(74) Attorney, Agent, or Firm — Van Leeuwen & Van Leeuwen; Jeffrey S. LaBaw

(57) ABSTRACT

An approach is provided that allows an administrator to set a new password at a wireless access point, such as a traditional WAP or a wireless router. The wireless access point creates a message that includes the new password. The message is encrypted using the old password that was previously set for the wireless network. The encrypted message is wirelessly transmitted from the wireless access point to the active client devices (those clients currently accessing the wireless network). The clients decrypt the message using the old password that was previously provided to the clients. The clients retrieve the new password from the message. The clients construct a new message that is encrypted using the new password. The new message is wirelessly transmitted from the clients to the wireless access device and serves as an acknowledgement.

17 Claims, 5 Drawing Sheets

AUTOMATIC WIRELESS NETWORK PASSWORD UPDATE

RELATED APPLICATIONS

This application is a continuation application of U.S. Non-Provisional patent application Ser. No. 11/336,205, entitled "System and Method for Automatic Wireless Network Password Update," filed on Jan. 20, 2006, now abandoned.

BACKGROUND OF THE INVENTION

1. Technical Field

The present invention relates in general to a system and method for updating passwords used to connect devices to wireless access points, such as routers. More particularly, the present invention relates to a system and method for automatically updating passwords used by clients to access a wireless access point.

2. Description of the Related Art

Wireless networking is increasingly popular in homes and businesses. This is especially true in environments where installing network cables between devices is difficult due to some building and home designs. In addition, computer users, especially laptop or notebook computer users, often want to connect to a computer network, such as the Internet, without being confined to a particular physical location.

Wireless networking often allows a user to roam 100 feet or more from a "wireless access point" or "WAP." The user's information handling system, such as a handheld device (e.g., a PDA, a music player, etc.), or a notebook/laptop computer includes a wireless network adapter or card that wirelessly transmits data to and receives data from other wireless network devices. Many wireless devices are built according to various standards, such as the IEEE 802.11 standards. The type of standard that a device uses dictates the range of other devices with which it can communicate.

A wireless access point (WAP or AP) is a device that "connects" wireless communication devices together to create the wireless network. The WAP is usually connected to a wired network, and can relay data between devices on each side. Many WAPs can be connected together to create a larger network that allows "roaming." In contrast, a network where the client devices manage themselves is called an ad-hoc network. A router is a network device that connects two similar networks that use the same network path. In a home or small business environment, a router often connects the user's local area network (LAN) to a broadband network connection, such as a cable modem, that, in turn, connects to an Internet Service Provider (ISP), thus giving any device on the local area network access to the Internet. Some routers include wireless technology that allows these routers, referred to as wireless routers, to also serve as Wireless Access Points. As used herein, a "Wireless Access Point" or "WAP" includes both traditional Wireless Access Points as well as wireless routers and any other device that facilitates the wireless connection of two or more devices.

While wireless networking offers users increased mobility and flexibility, it also challenges users by potentially increasing security risks. The wireless network often extends a hundred or more feet outside of the user's home or office environment. Others with wireless devices are able to connect to the user's wireless network unless the user secures the network. To address this security requirement, most WAPs provide a password mechanism. An administrator sets a password in the WAP and also provides the password to each client device that will be using the WAP. Traditionally, providing the password to the client devices required the administrator or user of the device to open a configuration panel on the device and enter the password. The WAP is configured to only communicate with devices that know the password. The WAP checks data packets it receives over the wireless network to see if they are encrypted using the password. If a packet is not encrypted using the password it is rejected. Likewise, packets wirelessly transmitted from the WAP to devices on the wireless network are encrypted using the password. In this manner, a snooper cannot communicate with the wireless network without obtaining the password.

While encrypting data sent over a wireless network helps keep snoopers out of the network, it presents a maintenance challenge. To ensure security, many security experts suggest changing passwords on a regular basis. Using a traditional wireless network, this requires changing the password at the WAP as well as the password used by each of the client devices. If the administrator or user forgets to change the password in one of the devices, that device will no longer be able to connect to the wireless network. This challenge is exacerbated when the number of wireless devices is large. Changing all the passwords on a larger wireless network can often take an extensive amount of time. In addition, with a large number of devices, the chance that one or more devices will not be updated is increased. Because of these challenges, administrators of wireless networks often neglect to update the password used for the wireless network as frequently as suggested by experts, thus increasing the chance that a snooper will obtain the password and surreptitiously access the wireless network.

What is needed, therefore, is a system and method that provides for password changes to be proliferated throughout a wireless network. What is further needed is a system and method that provides an expiration time after which the new password is no longer proliferated to client devices.

SUMMARY

It has been discovered that the aforementioned challenges are resolved using a system and method that allows an administrator to set a new password at a wireless access point, such as a traditional WAP or a wireless router. The wireless access point creates a message that includes the new password. The message is encrypted using the old password that was previously set for the wireless network. The encrypted message is wirelessly transmitted from the wireless access point to the active client devices (those clients currently accessing the wireless network). The clients decrypt the message using the old password that was previously provided to the clients. The clients retrieve the new password from the message. The clients construct a new message that is encrypted using the new password. The new message is wirelessly transmitted from the clients to the wireless access device and serves as an acknowledgement.

In one embodiment, a client that was disconnected when the wireless access point transmitted the message that included the password tries to connect to the wireless network using the old password (a newly activated client). The wireless access point responds by sending the newly activated client the message (the new password encrypted with the old password) and the newly activated client retrieves the new password and sends an encrypted message back to the wireless access point, using the new password, acknowledging the new password. In one embodiment, the wireless access point checks the old password supplied by the newly activated client to determine if it is "expired." If it is expired, then the wireless access point denies the connection request by the newly activated client. If the old password is not expired, then the wireless access point provides the new password to the client as described above.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
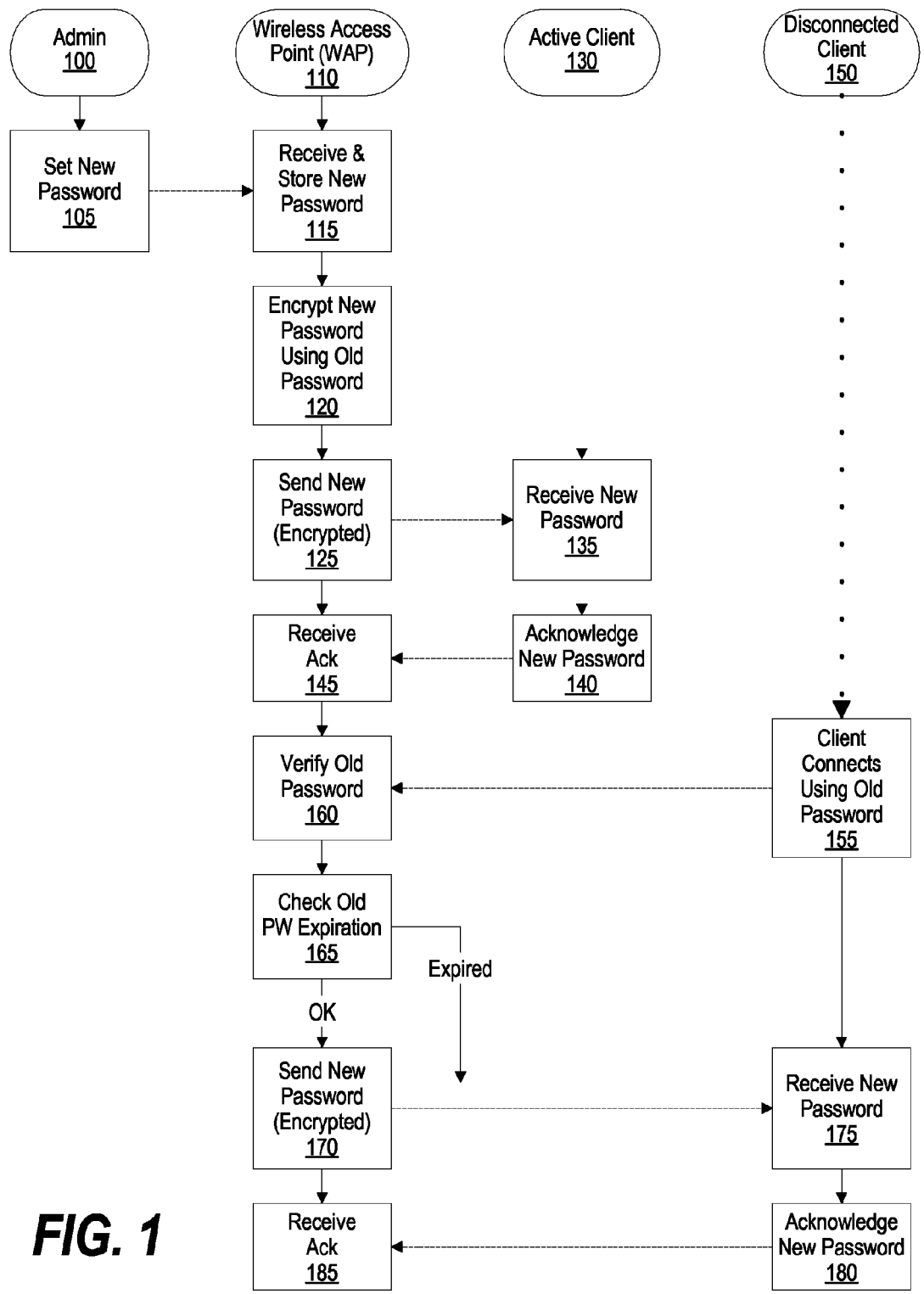
FIG. 1 is a diagram showing how password updates propagates between the administrator, the router, and the clients.

FIG. 1 is a diagram showing how password updates propagates between the administrator, the wireless access point, and the clients. The diagram shows a timeline with earlier events appearing towards the top of the diagram and later events appearing towards the bottom. The administrator's processing commences at 100 whereupon, at step 105, the administrator sets a new password for the wireless access point to use. In some embodiments, the administrator logs onto the wireless access point using a direct line rather than wirelessly connecting to the wireless access point. This prevents users from outside the physical area from changing the security settings, such as the password, stored in the wireless access point.

Wireless access point processing commences at 100 whereupon, at step 115 the wireless access point receives the new password from the administrator and stores it, preferably on a nonvolatile storage device accessible to the wireless access point. At step 120, the wireless access point creates a message that contains the new password and encrypts the message using the old (previous) password (as the clients currently use the old password to connect to the wireless access point and do not yet know the new password). At step 125, the wireless access point wirelessly transmits the encrypted message to all "active" clients. An active client is a client that is currently connected to the wireless access point, as opposed to a disconnected client that is not currently connected to the wireless access point.

Active client processing commences at 130 whereupon, at step 135, the active client receives the encrypted message that contains the new password. The client decrypts the message using the old password and then updates its configuration data by storing the new password. The client will now use the new password when encrypting/decrypting messages to/from the wireless access point. At step 140, the active client creates a new message that is encrypted using the new password. This messages serves as an acknowledgement. At step 145, the wireless access point receives the acknowledgement from the active client.

Disconnected client processing commences at 150. These clients were not connected to the wireless access point when the wireless access point sent the new password out to all active clients. At some point afterwards, the disconnected client connects to the wireless access point using the old password because the disconnected client does not know that the password has been changed (step 155). At this point, the disconnected client becomes a "newly activated client" as it is no longer disconnected from the wireless access point.

At step 160, the wireless access point receives the connection message from the newly activated client and verifies the connection using the old password. At step 165, the wireless access point checks the old password expiration to see if the old password is expired. If the old password is expired, the connection request is rejected by the wireless access point. However, if the old password is not yet expired, at step 170 the wireless access point creates a message that includes the new password and encrypts the message using the old password. The newly activated client receives the message at step 175. The newly activated client decrypts the message using the old password and retrieves the new password from the decrypted message. At step 180, the newly activated client creates a message encrypted using the new password and transmits the new message back to the wireless access point. This message serves as an acknowledgment from the newly activated client. At step 185, the wireless access point receives the acknowledgement from the newly activated client.

Figure 2:
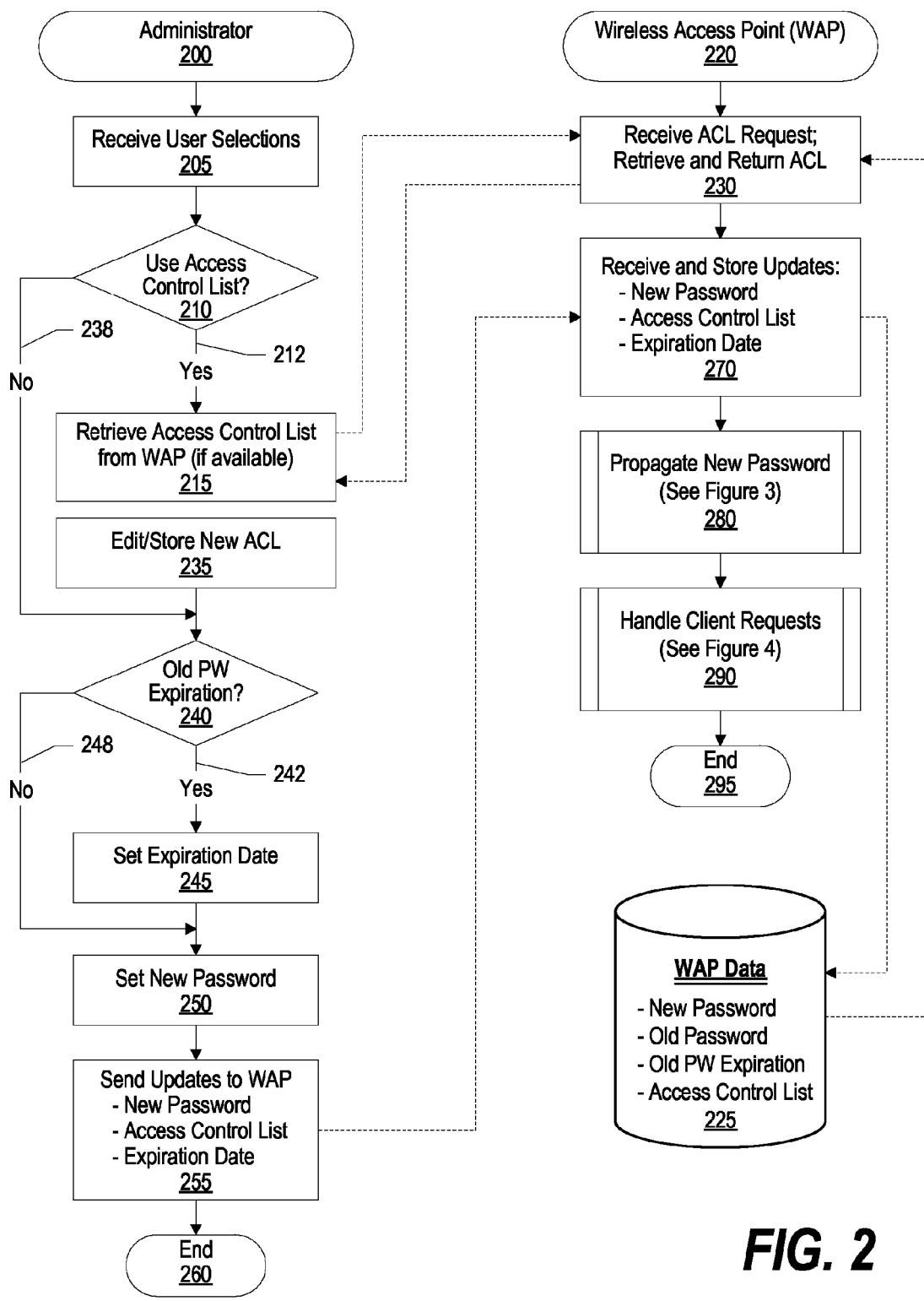
FIG. 2 is a flowchart showing steps taken between the administrator and the wireless access point in setting a new password and propagating it to clients.

FIG. 2 is a flowchart showing steps taken between the administrator and the wireless access point in setting a new password and propagating it to clients. Administrator processing commences at 200 whereupon, at step 205, the administrator (user) enters his or her selections, including whether an access control list (ACL) will be used to further secure the network as well as whether the old password will expire and, if so, what expiration will apply to the old password. A determination is made as to whether the administrator chose to use an access control list to further secure the network (decision 210). An access control list is a list of client identifiers that are able to access the wireless access point. The client identifiers may be MAC addresses that is a unique code assigned to most forms of networking hardware. The MAC address is permanently assigned to the hardware, so limiting a wireless network's access to hardware addresses, such as wireless cards included in the client devices, further secures the network. However, an experienced hacker might be able to spoof a MAC address which is why using passwords to encrypt messages to/from the wireless access point is also needed. If an access control list is being used, decision 210 branches to "yes" branch 212 whereupon, at step 215, the access control list is requested from the wireless access point (if an access control list has already been established).

Wireless access point processing commences at 220 whereupon, at step 230, the wireless access point receives a request for the access control list and returns the access control list to the administrator. The administrator receives the access control list and edits (adds and remove) and stores a revised access control list at step 235. Returning to decision 210, if the administrator chose not to use an access control list, decision 210 branches to "no" branch 238 bypassing steps 215 and 235.

A determination is made as to whether the administrator set an expiration limit for the old password (decision 240). In some embodiments, a default expiration can be used in lieu of receiving an expiration limit from the administrator. If an expiration limit applies to the old password, decision 240 branches to "yes" branch 242 whereupon, at step 245, the expiration date is set for the old password. On the other hand, if an expiration date does not apply to the old password, decision 240 branches to "no" branch 248 bypassing step 245.

At step 250, the new password provided by the administrator is set. At step 255, the updates are sent to the wireless access point. These updates include the new password that the wireless access point is to use, an updated access control list if provided, and an expiration limit on the old password if provided by the administrator. Administrator processing thereafter ends at 260.

Returning to wireless access point processing, at step 270, the wireless access point receives and stores the new password, the updated access control list (if provided), and the old password expiration (if provided). This data is stored in data store 225. In one embodiment, data store 225 is in a nonvolatile storage area accessible to the wireless access point. The access control list then propagates the new password to any active clients, i.e., those clients currently connected to the wireless access point (predefined process 270, see FIG. 3 and corresponding text for processing details). The wireless access point also continues to handle client requests (predefined process 290, see FIG. 4 and corresponding text for processing details). These requests may include connection requests from clients that did not receive the new password when it was propagated by predefined process 280. Wireless access point processing thereafter ends at 295.

Figure 3:
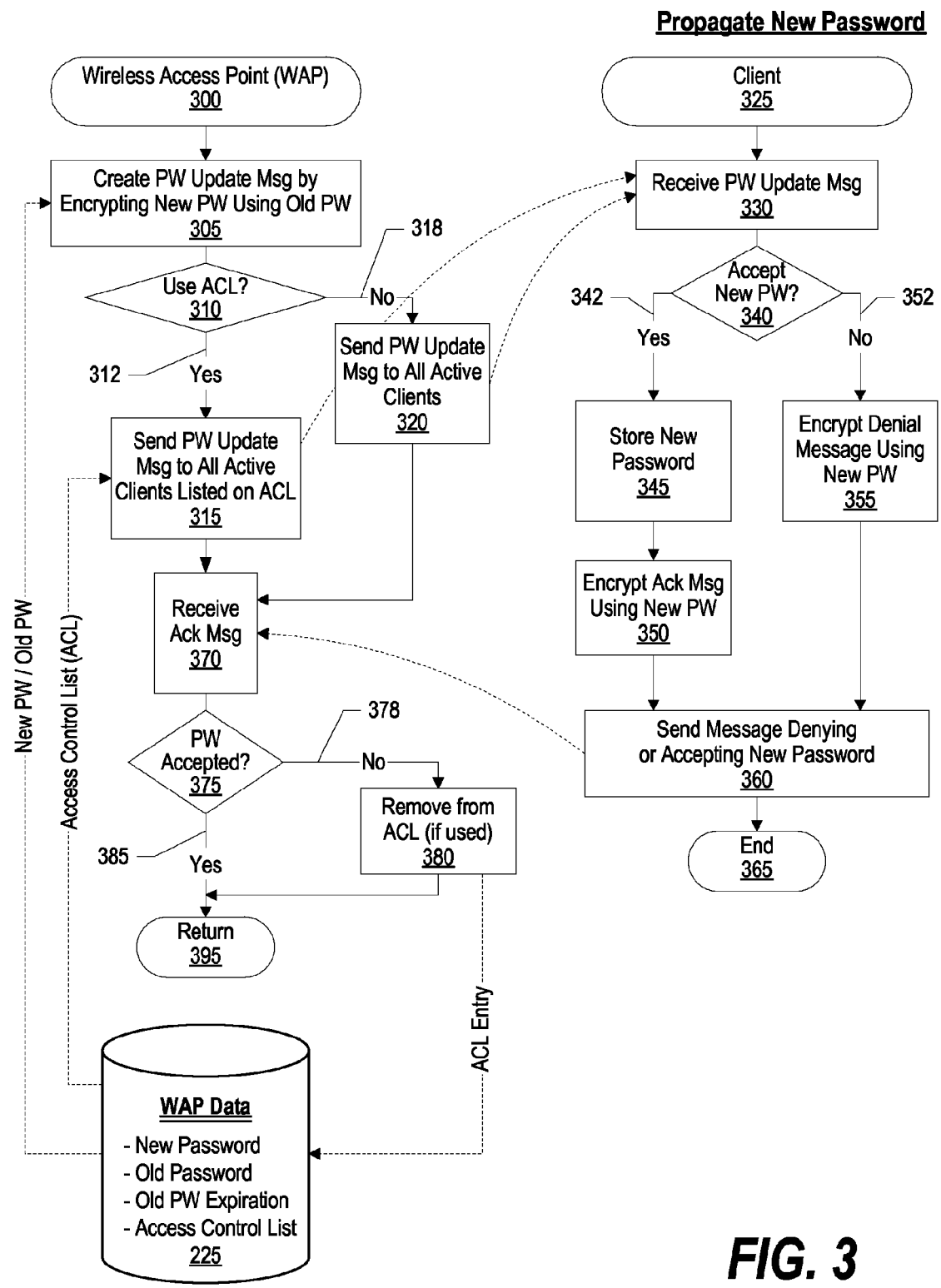
FIG. 3 is a flowchart showing steps taken between the wireless access point and client devices that are online when the wireless access point propagates the new password.

FIG. 3 is a flowchart showing steps taken between the wireless access point and client devices that are online when the wireless access point propagates the new password. Wireless access point processing commences at 300 whereupon, at step 305, the wireless access point creates a password update message by storing the new password in a message and encrypting the message using the old password. A determination is made as to whether the wireless network is using an access control list (decision 310). If an access control list is being used, decision 310 branches to "yes" branch 312 whereupon, at step 315, the encrypted password update message is sent to each client listed in the access control list. On the other hand, if an access control list is not being used, decision 310 branches to "no" branch 318 whereupon, at step 320, the wireless access point broadcasts the encrypted password update message to all active clients (i.e., all devices currently connected to the wireless access point).

Active client processing commences at 325 whereupon, at step 330, the client receives the encrypted password update message. A determination is made as to whether to accept or deny the new password (decision 340). Some devices that receive the new password may no longer have a need to connect to the wireless network. For example, if the administrator plans on selling or giving a client device to someone that does not need to connect to the network, then the new password update could be denied. If the new password update message is accepted by the client, decision 340 branches to "yes" branch 342 whereupon, at step 345 the new password is stored in the client's configuration data so that the client can continue to access the network and, at step 350, the client creates an acknowledgement message by encrypting the acknowledgement message using the new password. On the other hand, if the client does not wish to accept the new password, decision 340 branches to "no" branch 352 whereupon, at step 355, a denial message is encrypted using either the old password or the new password. At step 360, the client sends a responsive message back to the wireless access point either accepting or denying the new password. Client processing of the new password message thereafter ends at 365. In one embodiment, the user is informed (e.g., with a pop-up message) that the password has been changed.

Returning to wireless access point processing, at step 370 the client's response is received. A determination is made as to whether the client accepted the new password (decision 375). If the client did not accept the new password, decision 375 branches to "no" branch 378 whereupon, at step 380, the client is removed from the access control list (if an access control list is being used). On the other hand, if the password was accepted by the client, decision 380 branches to "yes" branch 385 bypassing step 380. Wireless access point processing then returns to the calling routine at step 395.

Figure 4:
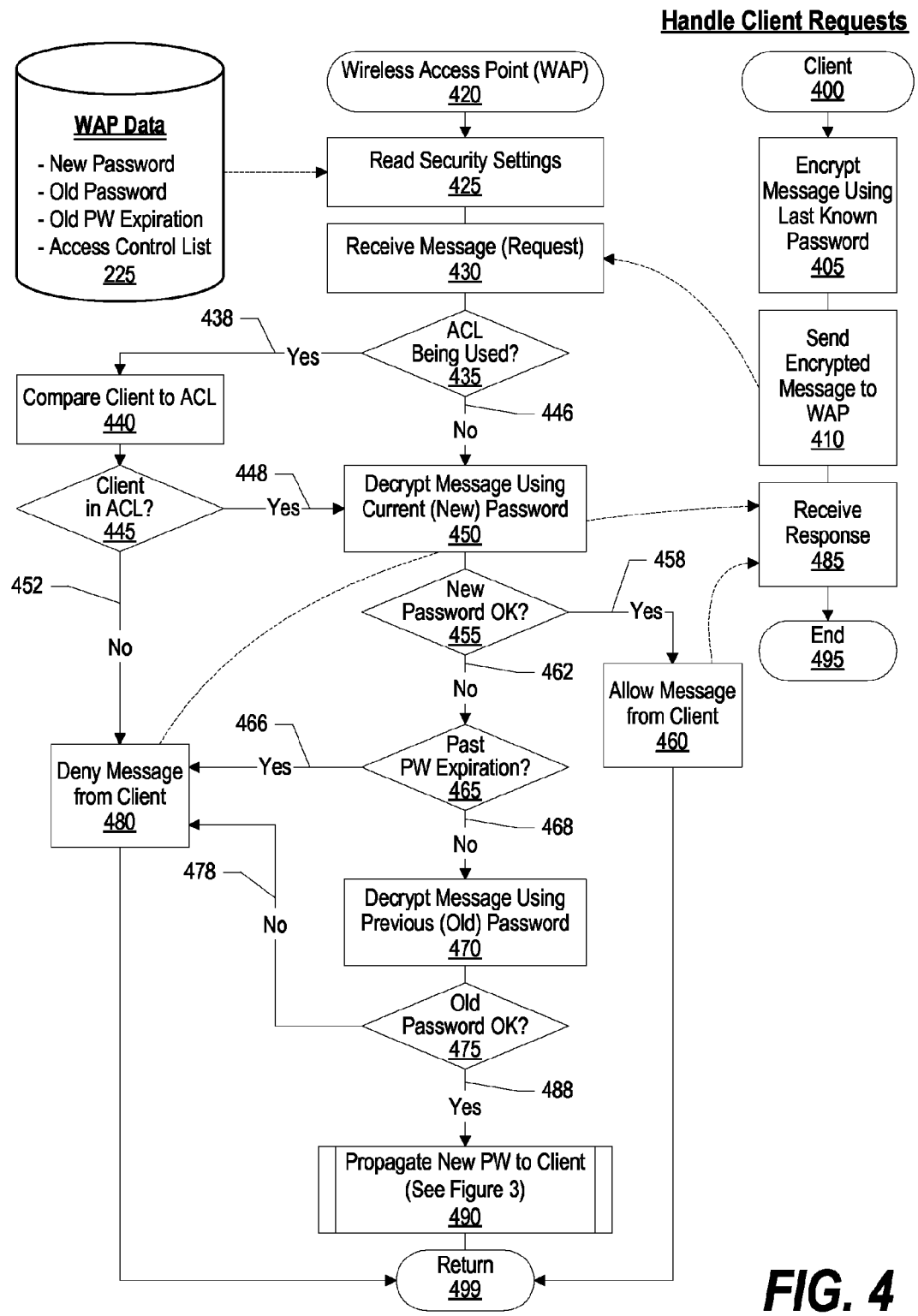
FIG. 4 is a flowchart showing steps taken between the wireless access point and client devices that were disconnected (not online) when the wireless access point propagates the new password.

FIG. 4 is a flowchart showing steps taken between the wireless access point and client devices that were disconnected (not online) when the wireless access point propagates the new password. Client processing commences at 400 whereupon, at step 405, the client encrypts a message using the last known password. If the client has not received the new password, then the last known password is different than the new password that was established by the administrator and that is being used by the wireless access point. However, if the client already received the new password, then the last known password is the same as the new password. At step 410, the client wirelessly transmits the encrypted message to the wireless access point.

Wireless access point processing commences at 420 whereupon, at step 425, the wireless access point reads its security settings from data store 225. The security settings include the new password being used by the wireless access point, the previous, or "old" password that was used by the wireless access point before the new password was established, an expiration date or time for the old password, and an optional access control list. At step 430, the wireless access point receives the encrypted message sent by the client.

A determination is made as to whether the wireless access point is using an access control list (decision 435). If an access control list is being used, decision 435 branches to "yes" branch 438 whereupon, at step 440, the client is compared to the access control list. A determination is made as to whether the client was found in the access control list (decision 445). If the client was not located in the access control list, decision 445 branches to "no" branch 452 whereupon, at step 480, the message from the client is denied and wireless access point processing returns at 499. On the other hand, if either the client is in the access control list (whereupon decision 445 branches to "yes" branch 448) or if an access control list is not being used (whereupon decision 435 branches to "no" branch 446), then, at step 450, the message is decrypted using the current, or "new," password that was established by the administrator.

A determination is made as to whether the new password successfully decrypts the message (decision 455). If the new password successfully decrypts the message, decision 455 branches to "yes" branch 458 whereupon, at step 460, the message is allowed from the client. On the other hand, if the new password did not successfully decrypt the message, decision 455 branches to "no" branch 462 to further analyze the message.

A determination is made as to whether any expiration date established for use of the old password has occurred and, therefore, use of the old password is expired (decision 465). If the old password is expired, decision 465 branches to "yes" branch 466 whereupon, at step 480, the message from the client is denied and wireless access point processing returns at 499.

On the other hand, if the old password is not expired, decision 465 branches to "no" branch 472 whereupon, at step 470, the message received from the client is decrypted using the old password. A determination is made as to whether the old password successfully decrypted the message (decision 475). If the old password did not successfully decrypt the password, decision 475 branches to "no" branch 478 whereupon, at step 480, the message from the client is denied and wireless access point processing returns at 499. On the other hand, if the old password did successfully decrypt the message, decision 475 branches to "yes" branch 488 whereupon the new password is propagated to the client (predefined process 490, see FIG. 3 and corresponding text for processing details). In one embodiment, two or more "old" passwords can be supported with each of the old passwords having its own password expiration criteria. Wireless access point processing thereafter returns at 499.

Returning briefly to client processing, at step 485 the client receives a response from the wireless access point (either accepting the message, denying the message, or a password update message that is encrypted with the old password and contains the new password). The client processes the response accordingly and client processing ends at 495.

Figure 5:
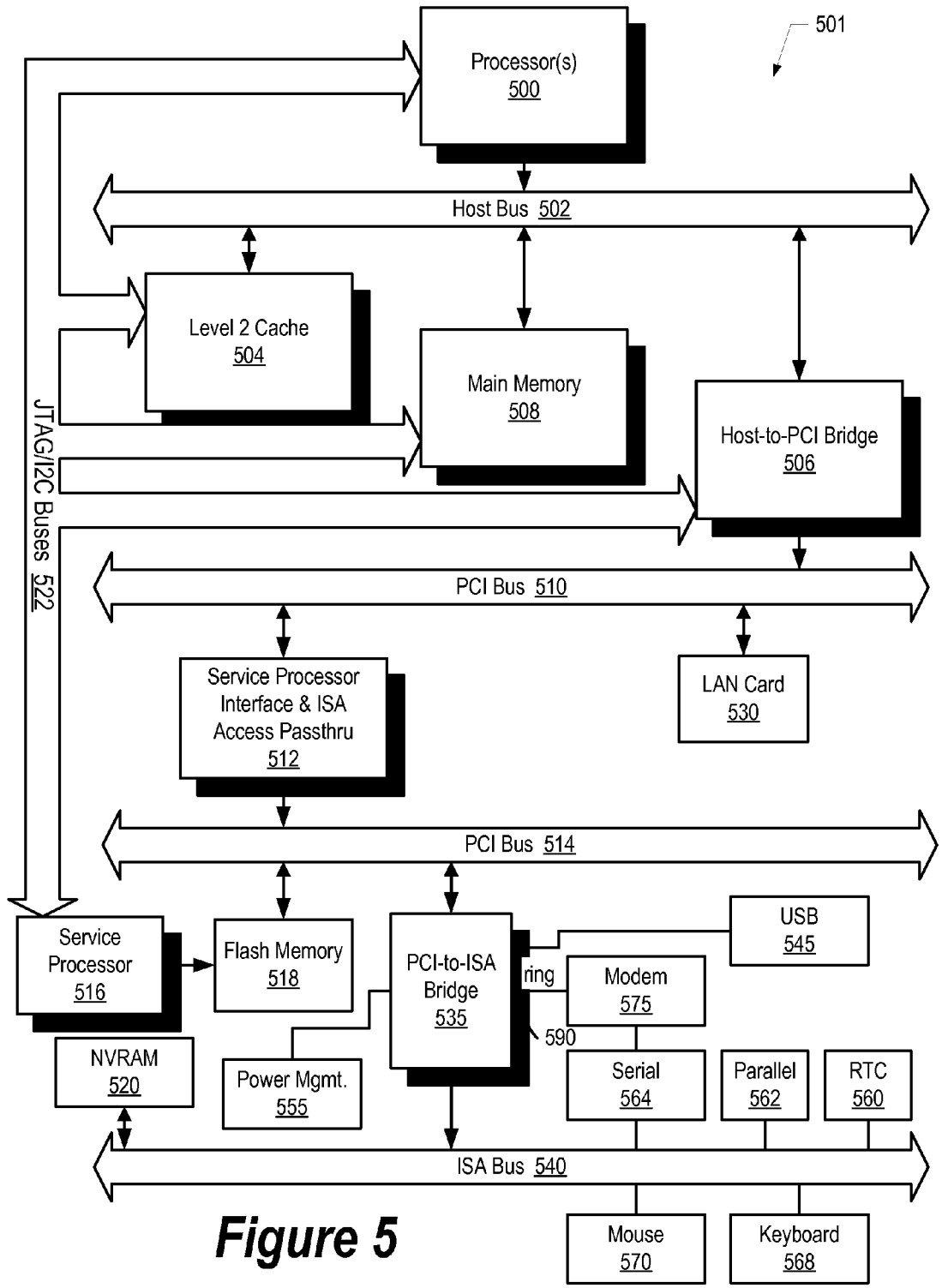
FIG. 5 is a block diagram of an information processing system capable of performing the computations contemplated in the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540. Real-time clock (RTC) 560 is also connected as a peripheral device and is used by the information handling system to perform timing operations.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

receiving, at a wireless access point, a new password to replace a current password, wherein the current password is used for encrypting and decrypting messages between the wireless access point and a plurality of clients;

creating, at the wireless access point, a first wireless message that includes the new password;

encrypting the first wireless message using the current password used to communicate with the wireless access point;

wirelessly transmitting the encrypted first wireless message from the wireless access point to one or more active clients, wherein the active clients are communicating with the wireless access point when the new password was received;

receiving, at the wireless access point, a first responsive wireless message from one or more of the active clients, wherein the first responsive wireless message is encrypted using the new password;

storing the current password as an old password in the wireless access point;

replacing the current password with the new password in the wireless access point;

receiving, at the wireless access point, a subsequent wireless message from a newly active client, wherein the newly active client commences communication with the wireless access point after the storing and replacing steps and wherein the subsequent wireless message is encrypted using the old password;

determining, at the wireless access point, that the subsequent wireless message is encrypted with the old password;

creating a second wireless message that includes the stored current password;

encrypting the second wireless message using the old password;

wirelessly transmitting the encrypted second wireless message to the newly active client; and receiving, at the wireless access point, a second responsive wireless message from the newly active client, wherein the second responsive wireless message is encrypted using the stored current password.

2. The method of claim 1 further comprising:

retrieving a current time and a stored expiration time at the wireless access point;

comparing the current time with the stored expiration time; and determining whether the old password is expired based on the comparison, wherein the transmission of the second wireless message is only performed in response to determining that the old password is not expired.

3. The method of claim 2 further comprising:

receiving the expiration time at the wireless access point prior to creating the first wireless message; and storing the expiration time on a nonvolatile storage area accessible to the wireless access point.

4. The method of claim 1 further comprising:

comparing an identifier corresponding to the newly activated client with one or more client identifiers listed in an access control list (ACL), wherein the second message is only sent if the newly activated client's identifier is included in the access control list.

5. The method of claim 1 further comprising:

retrieving, at the wireless access point, an access control list (ACL) that includes one or more client identifiers, wherein the one or more clients each correspond to one of the client identifiers included in the ACL.

6. The method of claim 1 further comprising:

identifying a denial in the first responsive wireless message received from one of the clients; and ceasing communications between the wireless access point and the client that included the denial in the first responsive wireless message.

7. The method of claim 1 further comprising:

receiving, at a selected one of the active clients, the encrypted first message from the wireless access point;

decrypting, at the selected active client, the encrypted first message using a wireless access password stored in a nonvolatile storage area accessible to the client;

retrieving, at the selected active client, the new password from the decrypted first message;

updating, at the selected active client, the wireless access password with the new password;

storing, at the selected active client, the updated wireless access password on the nonvolatile storage area;

encrypting, at the selected active client, the first responsive message using the new password;

wirelessly transmitting the encrypted first responsive message from the selected active client to the wireless access point; and notifying a user of the selected active client that the wireless access password has been updated.

8. An information handling system comprising:

one or more processors;

one or more network adapters, wherein at least one of the network adapters is a wireless network adapter;

a nonvolatile storage area accessible by the processors;

a process operated by the processors that provides wireless passwords to a plurality of client devices, wherein the wireless passwords are used for encrypting and decrypting messages between the wireless network adapter and the plurality of client devices, the process being effective to:

receive a new password;

create a first wireless message that includes the new password;

encrypt the first wireless message using a current password used to communicate with client devices through the wireless network adapter;

wirelessly transmit the encrypted first wireless message to one or more active client devices using the wireless network adapter, wherein the active client devices are communicating with the information handling system when the new password was received;

receive, at the wireless network adapter, a first responsive wireless message from one or more of the active client devices, wherein the first responsive wireless message is encrypted using the new password;

store the current password as an old password in the nonvolatile storage area;

replace the current password with the new password in the nonvolatile storage area;

receive, at the information handling system, a subsequent wireless message from a newly active client device, wherein the newly active client device commences communication with the information handling system after the current password is stored as the old password and after the current password is replaced with the new password and wherein the subsequent wireless message is encrypted using the old password;
determine, at the information handling system, that the subsequent wireless message is encrypted with the old password;
create a second wireless message that includes the stored current password;
encrypt the second wireless message using the old password;
wirelessly transmit the encrypted second wireless message to the newly active client device; and
receive, at the information handling system, a second responsive wireless message from the newly active client device, wherein the second responsive wireless message is encrypted using the stored current password.

9. The information handling system of claim 8 wherein the process is further effective to:
retrieve a current time;
retrieve a stored expiration time from the nonvolatile storage area;
compare the current time with the stored expiration time; and
determine whether the old password is expired based on the comparison, wherein the transmission of the second wireless message is only performed in response to determining that the old password is not expired.

10. The information handling system of claim 9 wherein the process is further effective to:
receive the expiration time from the nonvolatile storage area prior to creating the first wireless message; and
store the expiration time in the nonvolatile storage area.

11. The information handling system of claim 8 wherein the process is further effective to:
retrieve client identifiers from an access control list stored in the nonvolatile storage area; and
compare an identifier corresponding to the newly activated client with the client identifiers from the access control list (ACL), wherein the second message is only sent if the newly activated client device's identifier is included in the access control list.

12. The information handling system of claim 8 wherein the process is further effective to:
identify a denial in the first responsive wireless message received from one of the client devices; and
cease communications with the client device that included the denial in the first responsive wireless message.

13. A computer program product comprising:
a non-transitory computer operable medium having computer readable code, the computer readable code being effective to:
receive, at a wireless access point, a new password to replace a current password, wherein the current password is used for encrypting and decrypting messages between the wireless access point and a plurality of clients;
create, at the wireless access point, a first wireless message that includes the new password;
encrypt the first wireless message using the current password used to communicate with the wireless access point;
wirelessly transmit the encrypted first wireless message from the wireless access point to one or more active clients, wherein the active clients are communicating with the wireless access point when the new password was received;
receive, at the wireless access point, a first responsive wireless message from one or more of the active clients, wherein the first responsive wireless message is encrypted using the new password;
store the current password as an old password;
replace the current password with the new password;
receive, at the wireless access point, a subsequent wireless message from a newly active client, wherein the newly active client commences communication with the wireless access point after the current password is stored as the old password and after the current password is replaced with the new password and wherein the subsequent wireless message is encrypted using the old password;
determine, at the wireless access point, that the subsequent wireless message is encrypted with the old password;
create a second wireless message that includes the stored current password;
encrypt the second wireless message using the old password;
wirelessly transmit the encrypted second wireless message to the newly active client; and
receive, at the wireless access point, a second responsive wireless message from the newly active client, wherein the second responsive wireless message is encrypted using the stored current password.

14. The computer program product of claim 13 wherein the computer readable code is further effective to:
retrieve a current time and a stored expiration time at the wireless access point;
compare the current time with the stored expiration time; and
determine whether the old password is expired based on the comparison, wherein the transmission of the second wireless message is only performed in response to determining that the old password is not expired.

15. The computer program product of claim 14 wherein the computer readable code is further effective to:
receive the expiration time at the wireless access point prior to creating the first wireless message; and
store the expiration time on a nonvolatile storage area accessible to the wireless access point.

16. The computer program product of claim 13 wherein the computer readable code is further effective to:
compare an identifier corresponding to the newly activated client with one or more client identifiers listed in an access control list (ACL), wherein the second message is only sent if the newly activated client's identifier is included in the access control list.

17. The computer program product of claim 13 wherein the computer readable code is further effective to:
retrieve, at the wireless access point, an access control list (ACL) that includes one or more client identifiers, wherein the one or more clients each correspond to one of the client identifiers included in the ACL.

* * * * *